Aug. 18, 1931.　　A. H. GERBER ET AL　　1,819,087
DIRECTION SIGNAL FOR MOTOR VEHICLES
Filed Nov. 5, 1928
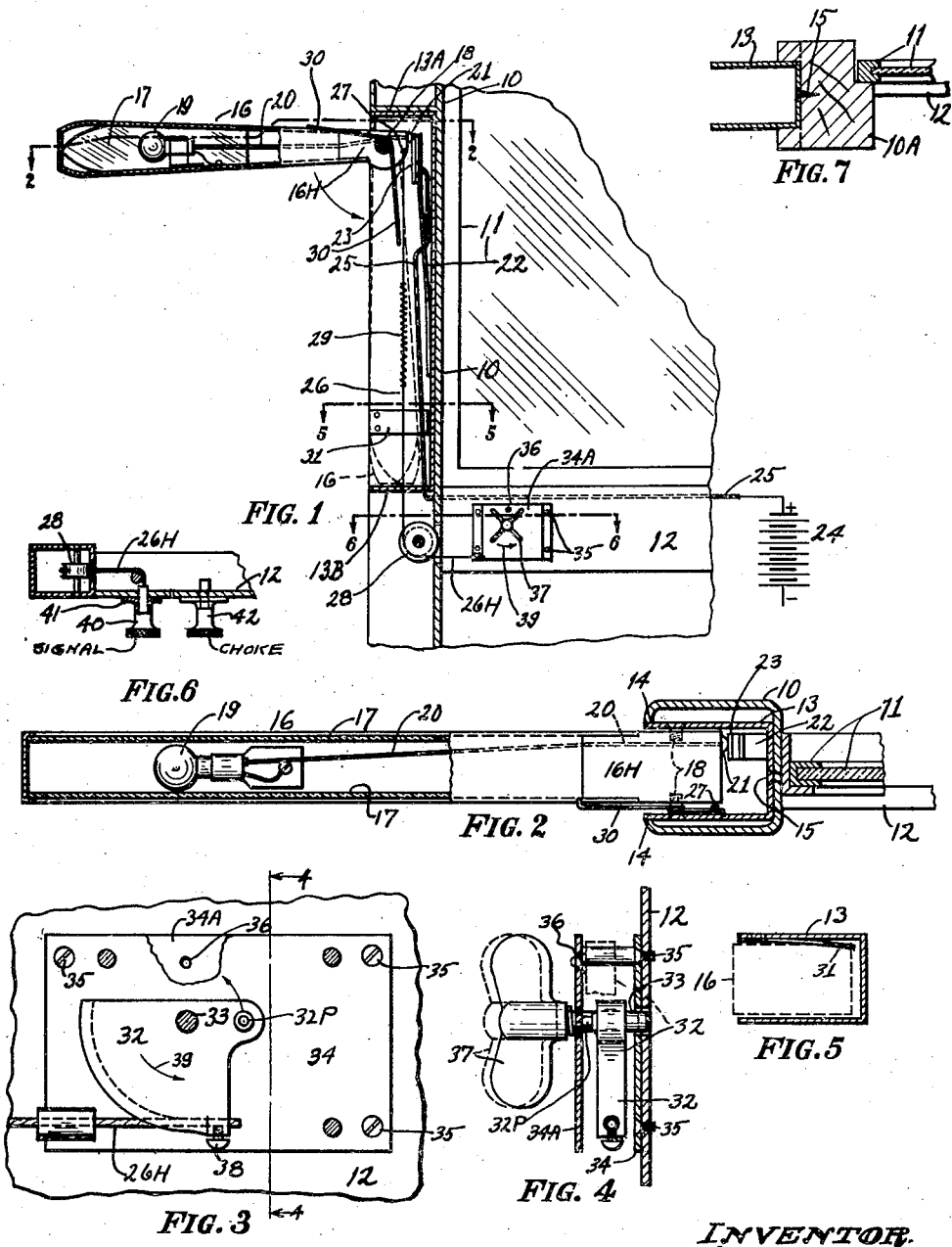
INVENTOR.
Albert H. Gerber
Joseph P. Marchal
BY David E. Carlsen
ATTORNEY.

Patented Aug. 18, 1931

1,819,087

UNITED STATES PATENT OFFICE

ALBERT H. GERBER AND JOSEPH P. MARCHAL, OF ST. PAUL, MINNESOTA

DIRECTION SIGNAL FOR MOTOR VEHICLES

Application filed November 5, 1928. Serial No. 317,270.

This invention relates to a direction signal particularly adapted for use on motor vehicle. The main object is to provide a simple, efficient and easily operated direction signal embodying certain useful features in construction and operation as hereinafter fully set forth and as illustrated in the accompanying drawings, in which,—

Fig. 1 is a rear view of our device in operative position in the front left-corner post of an automobile body looking forward as from the driver's seat, some parts of said post and the signal arm being shown in section.

Fig. 2 is an enlarged partly sectional view looking down as at line 2—2 of Fig. 1.

Fig. 3 is an enlarged rear view of a signal arm manipulating device mounted on a fixed part of the car forward of the driver, one plate of the device being mainly broken out to reveal certain mechanisms.

Fig. 4 is a vertical cross sectional view about as on line 4—4 in Fig. 3 showing additionally a finger operated turn button.

Fig. 5 is an enlarged cross sectional view of the main housing of our device as on line 5—5 in Fig. 1.

Fig. 6 is a sectional elevation on a horizontal plane through the corner post of a car and the adjacent instrument board, showing a modified form of signal arm manipulator.

Fig. 7 is a transverse sectional elevation of a wooden corner post of an auto and the shell or casing of our device applied thereto.

Referring to the drawings by reference numerals 10 designates the left front corner post of an automobile body of metal construction said post being tubular and of quadrangular shape in cross section, while 10A in Fig. 7 designates a wood post such as used in automobile bodies made of wood.

11 is the usual windshield frame and windshield below which is the instrument board 12 normally in upright plane and extending between the right and left front posts of a car body and of course forward of the driver's seat and accessible for reach by the driver.

Our device comprises an elongated upright main frame or shell 13 of metal and U-shape in cross section and having preferably the upper and lower end walls 13A and 13B respectively, said shell adapted to be inserted into a metal post 10 by providing a corresponding outwardly opening aperture 14 in said post so that said shell may be inserted with its outer edge coming normally flush with the exterior of the post (see Fig. 2) the shell being suitably fixed as with screws 15, rivets or welding. Our signal arm is a hollow metal arm 16 with suitable forwardly and rearwardly exposed openings with suitable transparent material or translucent material 17 of any color comprising windows fixed one in each of said face openings of the arm. The arm is pivoted as on screws 18, or equivalent, in the upper part of shell 13, to swing upwardly from a hanging position within the shell to a horizontal position. The hub of the arm, designated 16H, is preferably of insulation material. Between the windows 17 an electric bulb 19 is mounted in the arm and has suitable wire connection 20 to an inwardly exposed fixed contact 21 in the hub. 22 is a flat spring metal arm arranged vertically in shell 13 and fixed with its lower end to the inner wall of said shell, its upper part normally pressing outwardly and having a contact plate 23 continually pressing outwardly and contacting with the hub when the arm is down and against the contact 21 to close circuit to light 19 when the arm is raised. Current is provided from a source 24 through a wire 25 connected to plate 23.

Our signal arm is made in such size as to normally occupy most of the space within shell 13 when it depends from pivots 18 and has an outer plain wall which at such time presents a smooth outer face flush with the exterior of post 10. The arm is swung up by means of a wire 26, or equivalent, fixed at 27 to hub 13H and extending downwardly, under pulley 28 if necessary, and thence to an actuating mechanism on the instrument board which will presently be described. To avoid any too sudden action of arm 16 when signalling we provide a tension coil spring 29 in the upright part of the wire 26 (see Fig. 1). 30, Figs. 1 and 2, is a two armed coil spring preferably coiled about one of the pivots 18 and its arms engaging one on the signal arm and the other within casing 13 to normally hold the signal arm in its closed position. 31 is another flat spring in the lower part of housing 13 and fixed near the outer edge of one wall thereof, its inner free end normally sprung inwardly to be frictionally and yieldingly engaged by the side of the signal arm when the latter is in suspended position within the shell, thus to prevent any rattling.

It is now clear that when a downward pull is exerted on wire 26 the signal arm is swung up and out to horizontal in a vertical plane at right angles to the direction of movement of the vehicle, and when contact 21 is engaged by spring arm 22 circuit is closed to bulb 19 illuminating the signal arm only when it is in its horizontal signal position. Releasing the pull on wire 26 the signal arm instantly goes back to position within the shell 13 being impelled additionally by action of spring 31. We will now describe the preferred means for pulling the cord or wire 26.

In Figs. 3 and 4, 32 is a segmented pulley fixed on a horizontal shaft 33 pivotally mounted and slidable in and between two plates 34—34A of which 34 is fixed as at 35 to the instrument board 12 and forward of the driver's seat (not shown) and plate 34A is mounted in fixed spaced relation to plate 34. 32P is a fixed outwardly directed pin on pulley 32 and normally bearing against the inner side of plate 34A except when the pulley is oscillated to a position where said pin is pushed into an aperture 36 in said plate by a compression coiled spring about shaft 33 exteriorly of the plate 34A and between it and a suitable wing nut 37 (see Figs. 1 and 4). The pulley 32 has its groove normally below its pivot and the end of wire section 26H is suitably fixed as at 38 in the said pulley so that when said pulley is oscillated as in direction of arrow 39 (Figs. 1 and 3), wire 26 is pulled to cause the signal arm to be swung upwardly and will be held there when pin 32P snaps into aperture 36. The arm is dropped back by simply pushing forward on nut 37 causing pin 32P to be disengaged and the pulley is released.

In Fig. 6 an alternative means is shown for pulling the arm manipulating wire, namely a simple pull button 40 slidable in a socket 41 fixed on the instrument board, the forward end of said pull button being of course connected to the wire section 26H. The pull button 40 may be provided in various shapes or designs to correspond to the so-called choke-button 42 usually provided on the instrument board 12 of a car. These means are provided for car owners who prefer a signal operating plug corresponding in appearance to a choke-button or other part on the instrument board.

In Fig. 7 we have illustrated our housing 13 fixed in a groove in the outer face of a wooden car post 10A, showing that this device is applicable to such posts also though more exposed than the type illustrated in the other figures. An advantage in the mounting of our device is practically invisible when not in use and is not obstructive to be clogged or made ineffective by the elements.

We claim:

In a direction signal of the class described having an upright metal housing of U-shape in cross section and adapted to be fixed in a post of a motor vehicle with its open side in a plane with the outer face of said post; a signal arm pivotally suspended from the upper part of said housing and adapted to be manipulated to horizontal signaling position, said pivotal part of the arm comprising a hub with an inwardly exposed arcuate face, spring means fixed to the inner wall of the housing and bearing yieldably and outwardly against said arcuate face, said signal arm being of hollow construction and quadrangular in cross section, and further means engaging the signal arm only when it is in lowered position, said latter means comprising a flat spring fixed in a wall of the housing near its outer edge and extending inwardly in an angular plane and in the path of the signal arm to frictionally and yieldably engage it near its free end.

In testimony whereof we affix our signatures.

ALBERT H. GERBER.
JOSEPH P. MARCHAL.